US012648573B1

(12) United States Patent

Warberg Block et al.

(10) Patent No.: US 12,648,573 B1

(45) Date of Patent: Jun. 9, 2026

(54) ENHANCED BALSAM FIR OIL BY REGULATED ISOLATE CONCENTRATIONS FOR PEST CONTROL

(71) Applicant: EarthKind, LLC, Mooresville, NC (US)

(72) Inventors: Kari G. Warberg Block, Cornelius, NC (US); James E. McNew, Tazewell, TN (US)

(73) Assignee: EarthKind, LLC, Mooresville, NC (US)

( * ) Notice: Subject to any disclaimer, the term of this patent is extended or adjusted under 35 U.S.C. 154(b) by 0 days.

(21) Appl. No.: 19/313,380

(22) Filed: Aug. 28, 2025

(51) Int. Cl.
| | |
|---|---|
| *A01N 65/06* | (2009.01) |
| *A01N 25/18* | (2006.01) |
| *A01N 25/34* | (2006.01) |
| *A01N 27/00* | (2006.01) |
| *A01P 11/00* | (2006.01) |

(52) U.S. Cl.
CPC ............. *A01N 65/06* (2013.01); *A01N 25/18* (2013.01); *A01N 25/34* (2013.01); *A01N 27/00* (2013.01); *A01P 11/00* (2021.08)

(58) Field of Classification Search
CPC ........ A01N 65/06; A01N 27/00; A01N 25/18; A01N 25/34; A01P 11/00
See application file for complete search history.

(56) References Cited

U.S. PATENT DOCUMENTS

| | | | |
|---|---|---|---|
| 6,337,081 | B1 | 1/2002 | Warberg |
| 6,689,397 | B2 | 2/2004 | Clark |
| D513,868 | S | 1/2006 | Warberg |
| 10,791,744 | B2 | 10/2020 | Manhas |

| | | | |
|---|---|---|---|
| 2017/0231231 | A1 | 8/2017 | Enan |
| 2022/0174963 | A1 | 6/2022 | Bloomquist, III |
| 2023/0189820 | A1 | 6/2023 | Mui |

FOREIGN PATENT DOCUMENTS

| | | | |
|---|---|---|---|
| AU | 2012250276 | A1 | 6/2013 |
| CN | 101554178 | * | 10/2009 |
| CN | 101554178 | A * | 10/2009 |
| JP | 2011102245 | A | 5/2011 |
| JP | 6272075 | B2 | 1/2018 |
| JP | 2022057892 | A | 4/2022 |
| WO | 2022165229 | A1 | 8/2022 |

OTHER PUBLICATIONS

Demers (2019) in Frenchies natural products).*
"Product specification Organic Balsam Fir Essential oil" Aug. 30, 2023.*

* cited by examiner

*Primary Examiner* — Shirley V Gembeh
(74) *Attorney, Agent, or Firm* — Neustel Law Offices

(57) ABSTRACT

A standardized balsam fir oil composition is disclosed in which the concentrations of three behavior-modifying terpene isolates are fixed within narrowly defined ranges, alpha-pinene at 14.51%-14.55% by weight, beta-pinene at 27.12%-27.52% by weight, and beta-phellandrene at 8.06%-8.10% by weight, to eliminate natural batch-to-batch variation while maintaining 100% balsam fir oil content. The composition is prepared by extracting each isolate from balsam fir oil, analytically determining target concentration ranges, and re-introducing the extracted isolates to achieve the controlled levels, producing a performance-standardized essential-oil ingredient that delivers predictable rodent-repellent efficacy. This document further encompasses a method of repelling rodents in which the controlled-concentration composition is deployed in a treatment area for up to thirty days, optionally within breathable pouches or other vapor-release carriers, to maintain an atmosphere sufficient to trigger rodent flight responses across a range of environmental conditions.

20 Claims, 5 Drawing Sheets

The below 5-batch study, used to register Balsam Fir Oil as a TGAI with the USEPA

_26_

| Sample Ref. | 130371-1 | 130371-2 | 130371-3 | 130371-4 | 130371-5 | | | | | | Example of Enhanced BFO |
|---|---|---|---|---|---|---|---|---|---|---|---|
| Refractive Index | 1.4735 | 1.4731 | 1.4736 | 1.4740 | 1.4734 | | | | | | |
| Specific Gravity | 0.8780 | 0.8780 | 0.8810 | 0.8840 | 0.8790 | High | Low | Median | Mean | StdDev | |
| Name | Batch 1 | Batch 2 | Batch 3 | Batch 4 | Batch 5 | | | | | | |
| | % | % | % | % | % | | | | | | |
| Santene | 1.69 | 1.80 | 1.65 | 1.72 | 1.66 | 1.80 | 1.65 | 1.69 | 1.70 | 0.054 | |
| Tricyclene | 1.15 | 1.22 | 1.21 | 1.24 | 1.21 | 1.24 | 1.15 | 1.21 | 1.21 | 0.030 | |
| Thujene <alpha-> | 0.16 | 0.17 | 0.16 | 0.17 | 0.16 | 0.17 | 0.16 | 0.16 | 0.16 | 0.005 | |
| Pinene <alpha-> | 12.75 | 12.81 | 12.75 | 11.38 | 13.21 | 13.21 | 11.38 | 12.75 | 12.58 | 0.624 | 14.55 - 14.51 |
| Camphene | 8.51 | 9.02 | 8.90 | 9.11 | 8.83 | 9.11 | 8.51 | 8.90 | 8.87 | 0.206 | |
| Pinene <beta-> | 23.51 | 22.37 | 23.85 | 23.26 | 24.84 | 24.84 | 22.37 | 23.51 | 23.57 | 0.804 | 27.52 - 27.12 |
| Myrcene | 1.98 | 1.60 | 1.63 | 1.66 | 1.64 | 1.98 | 1.60 | 1.64 | 1.70 | 0.140 | |
| Phellandrene <alpha-> | 0.27 | 0.23 | 0.21 | 0.13 | 0.25 | 0.27 | 0.13 | 0.23 | 0.22 | 0.048 | |
| 3-Carene <delta-> | 13.39 | 15.47 | 14.17 | 15.32 | 14.30 | 15.47 | 13.39 | 14.30 | 14.53 | 0.773 | |
| Terpinene <alpha-> | 0.20 | 0.18 | 0.14 | - | 0.17 | 0.20 | 0.14 | 0.18 | 0.17 | 0.022 | |
| Cymene <para-> | 0.18 | 0.16 | 0.30 | 0.45 | 0.21 | 0.45 | 0.16 | 0.21 | 0.26 | 0.106 | |
| .beta.-Phellandrene | 7.03 | 6.19 | 5.99 | 5.77 | 6.19 | 7.03 | 5.77 | 6.19 | 6.23 | 0.427 | |
| Limonene | 9.56 | 7.95 | 8.11 | 8.64 | 7.21 | 9.56 | 7.21 | 8.11 | 8.29 | 0.781 | 8.10 - 8.06 |
| Terpinene <gamma-> | 0.30 | 0.33 | 0.25 | 0.15 | 0.29 | 0.33 | 0.15 | 0.29 | 0.26 | 0.062 | |
| Fenchone | 0.16 | 0.14 | 0.13 | 0.14 | - | 0.16 | 0.13 | 0.14 | 0.14 | 0.011 | |
| Unidentified | 0.10 | 0.10 | 0.13 | 0.12 | 0.12 | 0.13 | 0.10 | 0.12 | 0.11 | 0.012 | |
| Terpinolene | 1.38 | 1.41 | 1.22 | 0.94 | 1.32 | 1.41 | 0.94 | 1.32 | 1.25 | 0.170 | |
| Linalool | 0.11 | 0.14 | 0.15 | 0.13 | - | 0.15 | 0.11 | 0.14 | 0.13 | 0.015 | |
| Fenchyl alcohol <alpha-> | 0.11 | - | 0.10 | 0.10 | 0.10 | 0.11 | 0.10 | 0.10 | 0.10 | 0.004 | |

| | | | | | | | | | | |
|---|---|---|---|---|---|---|---|---|---|---|
| Camphor | 0.23 | 0.30 | 0.31 | 0.32 | 0.27 | 0.32 | 0.23 | 0.30 | 0.29 | 0.033 |
| Pinocarveol | - | - | 0.16 | 0.17 | 0.12 | 0.17 | 0.12 | 0.16 | 0.15 | 0.022 |
| Unidentified | 0.16 | 0.15 | 0.18 | 0.20 | 0.16 | 0.20 | 0.15 | 0.16 | 0.17 | 0.018 |
| Borneol | 0.85 | 1.11 | 0.91 | 0.96 | 0.91 | 1.11 | 0.85 | 0.91 | 0.95 | 0.088 |
| Cryptone | - | - | - | 0.14 | - | 0.14 | 0.14 | 0.14 | 0.14 | 0.000 |
| trans-Verbenol | - | - | - | 0.10 | - | 0.10 | 0.10 | 0.10 | 0.10 | 0.000 |
| Terpinen-4-ol | 0.29 | 0.29 | 0.38 | 0.35 | 0.32 | 0.38 | 0.29 | 0.32 | 0.33 | 0.035 |
| .alpha.-Terpineol | 0.74 | 0.49 | 0.79 | 0.65 | 0.87 | 0.87 | 0.49 | 0.74 | 0.71 | 0.130 |
| (-)-Myrtenol | - | - | 0.12 | - | 0.14 | 0.14 | 0.12 | 0.13 | 0.13 | 0.010 |
| cis-Verbenol | - | - | - | 0.11 | - | 0.11 | 0.11 | 0.11 | 0.11 | 0.000 |
| Piperitone | 0.20 | 0.19 | 0.13 | 0.17 | 0.12 | 0.20 | 0.12 | 0.17 | 0.16 | 0.032 |
| Bornyl acetate | 13.32 | 14.38 | 14.38 | 14.64 | 13.99 | 14.64 | 13.32 | 14.38 | 14.14 | 0.460 |
| Longipinene | 0.12 | 0.10 | 0.12 | 0.18 | 0.22 | 0.22 | 0.10 | 0.12 | 0.15 | 0.045 |
| Longifolene | 0.33 | 0.23 | 0.26 | 0.25 | - | 0.33 | 0.23 | 0.26 | 0.27 | 0.038 |
| Caryophyllene <beta-> | 0.46 | 0.54 | 0.50 | 0.48 | 0.51 | 0.54 | 0.46 | 0.50 | 0.50 | 0.027 |
| Humulene | 0.26 | 0.30 | 0.26 | 0.29 | 0.28 | 0.30 | 0.26 | 0.28 | 0.28 | 0.016 |
| Bisabolene <beta-> | 0.52 | 0.61 | 0.47 | 0.56 | 0.37 | 0.61 | 0.37 | 0.52 | 0.51 | 0.082 |

Established enhanced standards may vary based on the identification of isolates deemed most effective at repelling rodents. The example above is based on observational testing but is not all-inclusive.

ENHANCED BALSAM FIR OIL BY REGULATED ISOLATE CONCENTRATIONS FOR PEST CONTROL

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

This disclosure relates to pest control compositions. More specifically, this disclosure relates to enhanced balsam fir oil compositions having controlled isolate concentrations for improved rodent repellency.

Balsam fir oil (*Abies Balsamea*) (OPP Chemical Code 129035; CAS Registry No. 8021-28-1) is a natural essential oil extracted through distillation from balsam fir tree needles and stems. Balsam fir oil is registered by the United States Environmental Protection Agency as a Technical Grade Active Ingredient for manufacturing rodent repellent products. The essential oil contains various isolates including alpha-pinene, beta-pinene, camphene, limonene, bornyl acetate, and beta-phellandrene.

Balsam fir oil can be embodied in a baseline pouch formulation comprising approximately two weight-percent balsam fir oil blended with a dispersant effluent and natural-fiber carrier. The breathable pouch permits volatilization of the essential oil and delivers a reported rodent-repellent efficacy of about sixty-five to seventy percent over a thirty-day exposure interval before terpene depletion diminishes performance. This benchmark highlights the need for the present controlled-concentration composition, which eliminates batch-to-batch variability and achieves higher, more predictable repellency.

As a natural essential oil, balsam fir oil exhibits variation in isolate concentrations based on harvest region, soil type, climate, genetics, time of harvest, and environmental factors. This natural variation affects the efficacy of the oil as a rodent repellent from batch to batch. The variation may negatively impact the repellency effect depending upon whether specific isolates contribute to the overall efficacy.

SUMMARY

One general aspect includes a standardized balsam fir oil composition having controlled concentrations of alpha-pinene at 14.51% to 14.55% by weight, beta-pinene at 27.12% to 27.52% by weight, and beta-phellandrene at 8.06% to 8.10% by weight, where the controlled concentrations reduce natural batch-to-batch variation while maintaining 100% balsam fir oil content.

Implementations may include one or more of the following features. The composition where the controlled concentrations are achieved by adding isolated alpha-pinene, beta-pinene, and beta-phellandrene extracted from balsam fir oil back into a balsam fir oil base. The controlled concentrations provide enhanced rodent repellent efficacy compared to unenhanced balsam fir oil having natural variation in isolate concentrations. The alpha-pinene and beta-pinene concentrations balance the beta-phellandrene concentration to maintain a natural fragrance profile of balsam fir. The alpha-pinene, beta-pinene, and beta-phellandrene trigger flight responses in rodents. The controlled concentrations eliminate natural variation of terpene compounds and increase efficacy while remaining 100% natural balsam fir oil.

One general aspect includes a method of producing a standardized balsam fir oil composition that may include extracting alpha-pinene, beta-pinene, and beta-phellandrene from balsam fir oil. The method also includes establishing fixed concentration ranges for each isolate. The method also includes adding the extracted isolates into balsam fir oil to achieve controlled concentrations of alpha-pinene at 14.51% to 14.55% by weight, beta-pinene at 27.12% to 27.52% by weight, and beta-phellandrene at 8.06% to 8.10% by weight.

Implementations may include one or more of the following features. The method where the extracting utilizes distillation processes. The distillation processes may include steam distillation at temperatures that preserve terpene compound integrity. The exposing may include deploying the composition in a treatment area for up to 30 days. The exposing provides repellent efficacy across multiple production batches. The exposing demonstrates stable rodent repellent performance across multiple production batches. The method may include incorporating the composition into a breathable pouch that permits evaporation and dispersal of the composition. The exposing utilizes beta-pinene concentration to provide a peppery-minty scent profile component. The exposing further may include monitoring rodent behavior to confirm flight response effectiveness. The establishing may include identifying isolates that trigger flight responses in rodents. The adding maintains 100% balsam fir oil content while reducing batch-to-batch variation. The method may include analyzing natural batch-to-batch variation of terpene isolates in balsam fir oil prior to the establishing. The extracting may include using the same distillation processes used to extract the balsam fir oil.

One general aspect includes a method of repelling rodents may include exposing rodents to a balsam fir oil composition having controlled concentrations of alpha-pinene at 14.51% to 14.55% by weight, beta-pinene at 27.12% to 27.52% by weight, and beta-phellandrene at 8.06% to 8.10% by weight in an amount effective to trigger a flight response in the rodents. The method can also include an exposing step that comprises deploying the composition in a treatment area for up to 30 days. In one instance, the exposing provides consistent repellent efficacy across multiple production batches.

In some instances, the exposing demonstrates stable rodent repellent performance across multiple production batches and may utilize beta-pinene concentration to provide a peppery-minty scent profile component. The method can include incorporating the composition into a breathable pouch that permits evaporation and dispersal of the composition.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

FIGS. 3A and 3B collectively show a compositional-analysis table showing natural batch variation and target enhancement ranges for key isolates.

DETAILED DESCRIPTION

A. Overview

Figure 1:
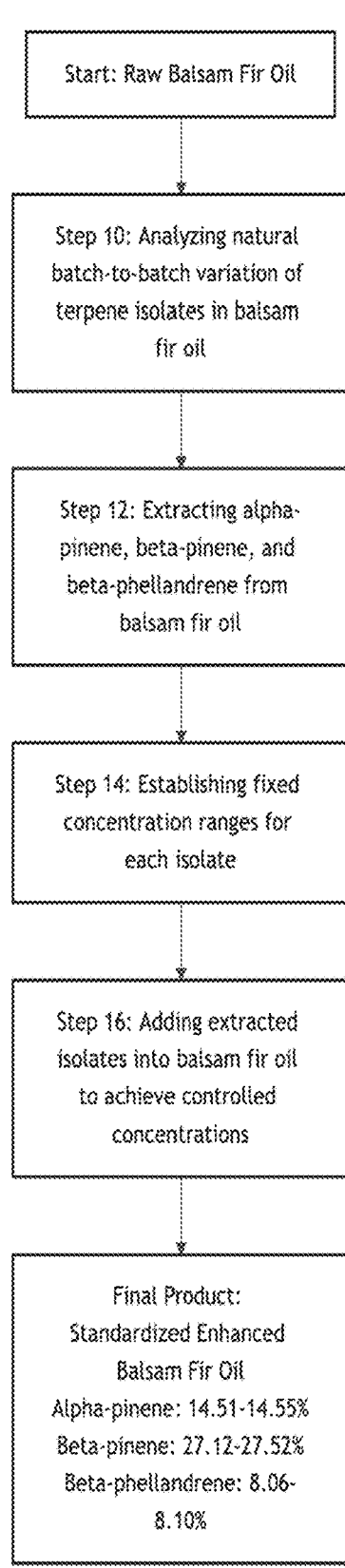
FIG. 1 is a process flow diagram depicting the method of producing the standardized balsam fir oil composition, including extraction, analysis, standardization, and reintroduction steps with process parameters and quality control measures.

This document discloses an enhanced balsam fir oil composition that addresses a fundamental problem in natural pest control products: the inherent variation in essential oil isolate concentrations that affects consistency and efficacy of rodent repellent formulations. The disclosed composition provides a solution through controlled enhancement of specific isolates while maintaining 100% natural balsam fir oil content, creating a premium natural pest control ingredient with predictable performance characteristics.

The disclosed composition includes systematic enhancement of isolate concentrations beyond naturally occurring ranges while preserving the essential oil's natural properties. The composition establishes specific enhanced concentration ranges: alpha-pinene at 14.51%-14.55% versus the natural range of 11.38%-13.21%, beta-pinene at 27.12%-27.52% versus natural 22.37%-24.84%, and beta-phellandrene at 8.06%-8.10% versus natural 5.77%-7.03%. These concentration parameters provide quantified enhancement targets for consistent rodent repellency performance.

The composition employs data-driven selection of isolates based on experimental identification of compounds that trigger rodent flight responses. The disclosed approach targets behaviorally active components rather than implementing random concentration modifications, resulting in enhanced efficacy through scientific isolate selection. Alpha-pinene, beta-pinene, and beta-phellandrene have been identified through experimentation to negatively affect rodent behaviors and trigger flight responses, making them optimal candidates for controlled enhancement.

In certain implementations, the composition addresses the natural variation problem that affects commercial pest control applications. Natural essential oil variation, evidenced by standard deviations of 0.624, 0.804, and 0.427 for key isolates across different batches, negatively impacts pest control efficacy and creates unreliable product performance. The disclosed composition converts an unreliable natural product into a consistent commercial pest control ingredient through controlled enhancement methodology that eliminates batch-to-batch variation while increasing efficacy.

The enhancement process maintains natural balsam fir fragrance characteristics and 100% natural content while achieving improved performance. The balanced concentrations of alpha-pinene and beta-pinene, which provide sweet and spicy pine scents, effectively balance the peppery-minty citrusy characteristics of beta-phellandrene to preserve the familiar balsam fir scent profile. This approach combines improved performance with maintained environmental profile and regulatory status advantages of natural essential oils. The methodology employs isolate extraction and reintroduction using the same distillation processes that create balsam fir oil to extract specific isolates and reintroduce them for controlled enhancement. This circular enhancement approach uses the essential oil's own components to achieve performance improvement through systematic methodology rather than synthetic addition or genetic modification approaches, maintaining natural composition integrity while enabling performance enhancement.

B. Example Implementations

FIG. 1 illustrates a method of producing a standardized balsam fir oil composition comprising extracting alpha-pinene, beta-pinene, and beta-phellandrene from balsam fir oil. The method generally includes establishing fixed concentration ranges for each isolate, as well as adding the extracted isolates into balsam fir oil to achieve controlled concentrations of alpha-pinene at 14.51% to 14.55% by weight, beta-pinene at 27.12% to 27.52% by weight, and beta-phellandrene at 8.06% to 8.10% by weight.

In more detail, and in certain implementations, the method includes an initial step of 10 analyzing natural batch-to-batch variation of terpene isolates in balsam fir oil. This analyzing step employs gas chromatography-mass spectrometry to determine the natural distribution of key isolates across multiple production batches. The analysis reveals standard deviations of 0.624 for alpha-pinene, 0.804 for beta-pinene, and 0.427 for beta-phellandrene, demonstrating significant natural variation that impacts product consistency. Statistical analysis includes calculation of confidence intervals and determination of minimum enhancement levels required to achieve consistent performance. Analyzing may involve sampling multiple batches from different harvest regions and seasons to establish comprehensive baseline data that guides subsequent enhancement targeting.

According to some embodiments, the method includes a step of 12 extracting alpha-pinene, beta-pinene, and beta-phellandrene from balsam fir oil. This extracting utilizes distillation processes, including steam distillation at temperatures that preserve terpene compound integrity. The distillation processes comprise steam distillation at temperatures below 100° C. to prevent thermal degradation of sensitive terpene compounds. The extracting process comprises using the same distillation processes used to extract the balsam fir oil, ensuring chemical compatibility and maintaining natural composition integrity. Alternative extraction methods may include fractional distillation, vacuum distillation, or supercritical fluid extraction. The extraction apparatus may include a distillation column with multiple theoretical plates, condenser systems operating at controlled temperatures, and automated collection vessels that segregate different terpene fractions based on boiling point ranges.

In alternative implementations, the method includes a step of 14 establishing fixed concentration ranges for each isolate. This step comprises identifying isolates that trigger flight responses in rodents through systematic behavioral testing protocols. The process also involves analyzing the extracted isolates to determine optimal enhancement levels that maximize rodent repellency while preserving natural fragrance characteristics. Dose-response testing determines minimum effective concentrations and maximum tolerable levels that maintain consumer acceptance. Statistical modeling may be employed to optimize concentration ranges that balance efficacy with manufacturing feasibility, regulatory compliance, and cost considerations. The establishing step 14 may include field testing under various environmental conditions to validate laboratory-determined concentration targets.

In specific embodiments, the method includes a step of 16 adding the extracted isolates into balsam fir oil to achieve the controlled concentrations. This adding step maintains 100% balsam fir oil content while reducing batch-to-batch variation through precise metering and blending operations. The addition process involves calculated dosing of extracted isolates to reach target concentration ranges while preserving the natural fragrance profile through controlled mixing protocols. Quality control measures ensure consistent blending and homogeneous distribution throughout the final composition using continuous mixing systems with real-time monitoring. The adding step may utilize automated dosing systems with feedback control to maintain precise concentration targets throughout the production run, ensuring reproducible results across multiple manufacturing batches.

Figure 2:
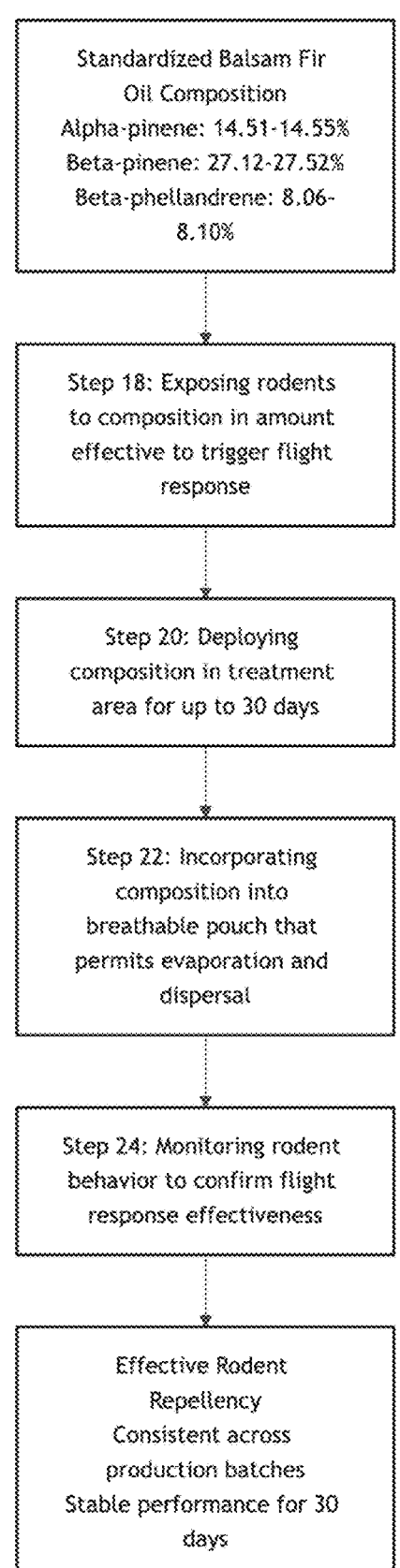
FIG. 2 is a deployment and application diagram showing the method of repelling rodents using the standardized composition, including delivery mechanisms, treatment area coverage, and efficacy monitoring over time.

FIG. 2 depicts a method of repelling rodents comprising exposing rodents to a balsam fir oil composition having controlled concentrations of alpha-pinene at 14.51% to 14.55% by weight, beta-pinene at 27.12% to 27.52% by weight, and beta-phellandrene at 8.06% to 8.10% by weight in an amount effective to trigger a flight response in the rodents.

In exemplary embodiments, the method includes a step of 18 exposing rodents to the composition in an amount effective to trigger a flight response. This exposing step provides consistent repellent efficacy across multiple production batches, eliminating performance variation associated with natural essential oil compositions. The exposing step demonstrates stable rodent repellent performance across multiple production batches through the controlled concentration methodology that standardizes active component levels. The exposing step also utilizes beta-pinene concentration to provide a peppery-minty scent profile component that contributes to the overall repellent effect while maintaining natural fragrance characteristics. The controlled concentrations ensure that each application delivers predictable rodent repellency regardless of the original batch variation in source materials.

According to another aspect, the method includes a step of 20 deploying the composition in a treatment area for up to 30 days. This deploying step involves strategic placement of the composition to maximize coverage while ensuring continuous vapor release throughout the treatment period. The deployment step utilizes application points calculated based on treatment area volume, air circulation patterns, and ambient environmental conditions that affect volatilization rates. The 30-day efficacy period represents the duration over which the composition maintains sufficient vapor concentration to trigger consistent rodent flight responses under typical field conditions. Deployment strategies may include perimeter placement for exclusion zones, area saturation for comprehensive coverage, or targeted application at known rodent entry points and nesting sites based on behavioral patterns.

In further implementations, the method includes a step of 22 incorporating the composition into a breathable pouch that permits evaporation and dispersal of the composition. This incorporating step utilizes porous materials engineered to provide controlled vapor release while protecting the composition from environmental contamination and moisture absorption. The breathable pouch comprises materials selected for optimal permeability to terpene compounds while maintaining mechanical integrity under field conditions including temperature fluctuations and humidity variations. Pouch design parameters include pore size distribution optimized for terpene molecular dimensions, material compatibility with essential oils to prevent chemical degradation, and sealing methods that ensure consistent release kinetics throughout the deployment period.

In additional embodiments, the method includes a step of 24 monitoring rodent behavior to confirm flight response effectiveness. This monitoring step involves observing rodent populations before, during, and after treatment to quantify repellent efficacy through behavioral assessment protocols. The monitoring step may include population counts, behavioral observation studies, and tracking of rodent movement patterns to confirm that the controlled concentrations effectively trigger flight responses. Data collection methods May involve automated monitoring systems, visual observation protocols, or indirect evidence assessment such as reduced feeding activity and nesting behavior in treated areas. The monitoring provides feedback for optimizing deployment strategies and validating the effectiveness of the controlled concentration approach across different rodent species and environmental conditions.

FIGS. 3A and 3B illustrate a comprehensive compositional analysis table 26 demonstrating the natural batch-to-batch variation in balsam fir oil isolates and the corresponding enhanced concentration targets for the standardized composition. The table 26 presents data from a 5-batch study used to register Balsam Fir Oil as a Technical Grade Active Ingredient with the USEPA, showing sample references 130371-1 through 130371-5 with corresponding refractive index and specific gravity measurements.

The compositional analysis reveals significant natural variation across multiple terpene isolates, with particular emphasis on the three key compounds targeted for enhancement. Alpha-pinene concentrations range from a low of 11.38% to a high of 13.21% across the five batches, with a mean of 12.58% and standard deviation of 0.624. The enhanced concentration target for alpha-pinene is established at 14.51% to 14.55%, representing a systematic increase above the natural range to optimize rodent repellent effectiveness.

Beta-pinene demonstrates even greater natural variation, ranging from 22.37% to 24.84% with a mean of 23.57% and standard deviation of 0.804. The enhanced target concentration for beta-pinene is set at 27.12% to 27.52%, providing substantial enhancement above natural levels while maintaining chemical stability and fragrance profile compatibility. This represents the largest absolute increase among the three target isolates, reflecting beta-pinene's role in triggering rodent flight responses.

Beta-phellandrene shows natural concentrations ranging from 5.77% to 7.03% with a mean of 6.23% and standard deviation of 0.427. The enhanced concentration target of 8.06% to 8.10% represents a significant relative increase that optimizes the peppery-minty scent characteristics while maintaining overall fragrance balance. The enhancement maintains the natural fragrance profile through careful consideration of scent interactions between the three primary isolates.

The table 26 includes comprehensive data for additional terpene compounds including santene, tricyclene, alpha-thujene, camphene, myrcene, alpha-phellandrene, delta-3-carene, alpha-terpinene, para-cymene, limonene, gamma-terpinene, fenchone, terpinolene, linalool, alpha-fenchyl alcohol, camphor, pinocarveol, borneol, cryptone, trans-verbenol, terpinen-4-ol, alpha-terpineol, myrtenol, cis-verbenol, piperitone, bornyl acetate, longipinene, longifolene, beta-caryophyllene, humulene, and beta-bisabolene. These compounds remain at their natural concentrations in the enhanced composition to preserve the complete chemical profile and regulatory status.

The refractive index measurements range from 1.4731 to 1.4740 across the five batches, indicating consistent optical properties despite compositional variations. Specific gravity values range from 0.8780 to 0.8840, demonstrating typical density characteristics for balsam fir essential oil. These physical property measurements provide quality control parameters for verifying composition authenticity and processing consistency.

The natural variation data supports the need for controlled enhancement by demonstrating how batch-to-batch differences in key isolates affect product consistency. Standard deviations exceeding 0.4 for repellent compounds illustrate the challenge of achieving reliable performance with unenhanced natural compositions. The systematic enhancement approach addresses this variability by establishing fixed concentration targets that exceed natural ranges while maintaining 100% balsam fir oil content.

The enhanced concentration standards may vary based on identification of additional isolates deemed effective at repelling rodents through behavioral testing. The example provided represents initial optimization based on observational testing but is not all-inclusive of potential future enhancements. Additional isolates may be targeted for controlled enhancement as behavioral research identifies other compounds that contribute to rodent repellent effectiveness.

Quality control protocols ensure that enhanced compositions maintain the specified concentration ranges for the three target isolates while preserving natural levels of all other compounds. Gas chromatography-mass spectrometry analysis verifies composition consistency and confirms that enhancement processes do not alter the essential chemical character of balsam fir oil. The controlled enhancement methodology provides a foundation for reliable commercial pest control applications requiring predictable performance characteristics.

Although the foregoing embodiments focus on commensal-rodent deterrence, preliminary field observations in equine facilities indicate that the same controlled-concentration balsam fir oil composition repels synanthropic flies (e.g., *Musca domestica*) when deployed at the dosage rates set forth above. Accordingly, in certain implementations the composition may be positioned as a broad-spectrum vertebrate or invertebrate repellent, with concentration ranges, extraction methodology and carrier formats remaining identical to those described for rodent applications.

Figure 4:
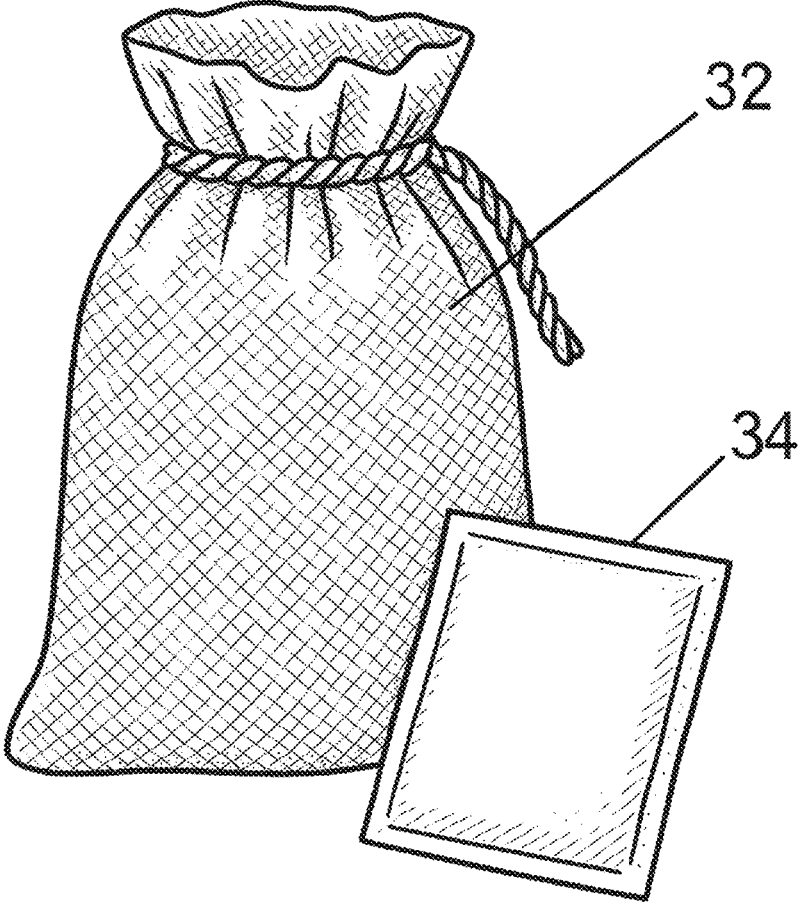
FIG. 4 is a perspective view that pairs two cooperating articles: a breathable pouch and an optional inner sachet.

Referring now to FIG. 4, a breathable pouch 32 is illustrated together with an inner sachet 34. The pouch 32 is fabricated from a porous, breathable material, constructed in such a way as to contain the essential oils and carrier materials, that permits the evaporation and release of the essential oils into the surrounding area while substantially retaining the liquid phase. The upper margin of pouch 32 is folded to define a draw-string channel; a cord received within that channel allows the mouth of pouch 32 to be selectively opened for filling and subsequently drawn closed, safeguarding the contents during transport and use. The opposing side edges and the base edge of pouch 32 are permanently joined, for example by stitching, adhesive bonding, or heat sealing, to define an enclosed interior cavity dimensioned to receive the inner sachet 34.

The inner sachet 34 is depicted in front of pouch 32 to illustrate its independent construction and its intended positional relationship to the pouch. Sachet 34 is formed from a finer non-woven or micro-perforated substrate and is perimeter-sealed to encapsulate a metered charge of the standardized composition. Because sachet 34 retains the liquid content even under compression, it may be handled, weighed, or replaced without soiling the surrounding pouch 32. During use, sachet 34 is inserted through the open mouth of pouch 32, after which the draw-string is tightened to close the pouch, whereupon vapors emitted from sachet 34 egress through the porous wall of pouch 32 into the surrounding environment.

C. Operation of Example Embodiment

The standardized balsam fir oil composition may be deployed for rodent repellent applications using various delivery methods designed to optimize vapor release and area coverage. The composition provides consistent performance characteristics that enable predictable deployment strategies across different environmental conditions and treatment scenarios. For context, the above-described standardized composition was evaluated side-by-side with the conventional two-percent pouch product described in the Background. Laboratory flight-response assays showed a statistically significant increase in avoidance behavior ($p<0.05$) when rodents were exposed to the controlled-concentration composition, confirming that enhancement of α-pinene, β-pinene and β-phellandrene provides efficacy beyond the historical sixty-five-to-seventy-percent benchmark.

For typical residential applications, the composition may be deployed at a rate of approximately 2-5 grams per 100 square feet of treatment area, depending on ambient temperature, humidity, and air circulation conditions. Higher deployment rates may be required in areas with significant air movement or outdoor applications where vapor dispersion occurs more rapidly. The composition maintains effective vapor concentrations for approximately 30 days under normal indoor conditions, with replacement schedules adjusted based on environmental factors that affect volatilization rates.

In commercial or agricultural settings, deployment density may be increased to 5-10 grams per 100 square feet to account for larger volumes and more challenging environmental conditions. Treatment areas should be assessed for air circulation patterns, with deployment points positioned to maximize vapor distribution throughout the target zone. Perimeter placement strategies provide effective exclusion barriers, while area saturation approaches offer comprehensive coverage for enclosed spaces with established rodent populations.

The composition may be incorporated into breathable pouches manufactured from porous materials that permit controlled vapor release while protecting the composition from moisture and environmental contamination. Pouch materials should be selected for optimal permeability to terpene compounds, with pore sizes ranging from 10-50 microns to balance release rates with protection requirements. Alternative deployment methods include direct application to absorbent carriers, incorporation into solid matrices, or aerosol delivery systems for rapid area treatment.

Deployment points can be positioned at rodent entry points, along travel routes, and near potential nesting sites based on behavioral assessment of target species. Strategic placement at floor level optimizes vapor contact with rodent olfactory systems, while elevated placement may be appropriate for climbing species or areas with specific air circulation patterns.

Ambient temperature significantly affects vapor release rates, with optimal performance occurring at temperatures between 60-80° F. Higher temperatures increase volatilization rates and may require more frequent replacement, while lower temperatures extend duration but may reduce vapor concentration below effective levels. Humidity levels above 70% may affect vapor dispersion patterns and should be considered when establishing deployment schedules.

Air circulation requirements vary based on treatment objectives, with minimal air movement for sustained vapor concentrations in enclosed areas, while moderate circulation may be beneficial for larger spaces requiring uniform distribution. Outdoor applications require assessment of wind patterns and may benefit from protected deployment positions that reduce rapid vapor dispersion.

Effectiveness may be evaluated through behavioral observation of target rodent populations, including assessment of feeding activity, nesting behavior, and movement patterns within treated areas. Population monitoring should be conducted at regular intervals to confirm sustained repellent effects and determine optimal replacement schedules for specific environmental conditions.

Visual inspection of deployment pouches provides indication of composition depletion, with replacement recommended when pouches appear significantly reduced in volume or when vapor detection becomes minimal. Electronic monitoring systems may be employed for automated assessment of vapor concentrations or rodent activity levels in applications.

The composition maintains its natural essential oil classification and presents minimal safety concerns under normal use conditions. Standard precautions for essential oil handling should be observed, including avoiding direct skin contact and ensuring adequate ventilation during deployment activities. The composition should be stored in sealed containers away from heat sources and direct sunlight to preserve terpene compound integrity.

Users should be advised that the enhanced concentrations of specific terpene compounds may produce stronger scent characteristics compared to unenhanced balsam fir oil, though the natural fragrance profile is maintained through balanced formulation. Individuals with known sensitivities to essential oils or terpene compounds should exercise appropriate caution during deployment and use.

Regular inspection of deployment sites ensures optimal performance and identifies any factors that may affect effectiveness. Replacement schedules should be established based on environmental conditions, with typical intervals ranging from 2-4 weeks for outdoor applications to 4-6 weeks for protected indoor environments. Performance logs May be maintained to optimize replacement timing and deployment strategies for specific applications.

Quality control testing of replacement compositions ensures consistent performance characteristics across different production batches. Users may verify composition effectiveness through controlled testing with small rodent populations prior to full-scale deployment in applications where performance predictability is essential.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

The present invention may be embodied in other specific forms without departing from the spirit or essential attributes thereof, and it is therefore desired that the present embodiment be considered in all respects as illustrative and not restrictive. Many modifications and other embodiments of the present disclosure will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the embodiments in the present disclosure, suitable methods and materials are described above. Thus, the present disclosure is not intended to be limited to the embodiments shown, but is to be accorded the widest scope consistent with the principles and features disclosed herein.

What is claimed is:

1. A standardized balsam fir oil composition, comprising: balsam fir oil having controlled concentrations of alpha-pinene at 14.51% to 14.55% by weight, beta-pinene at 27.12% to 27.52% by weight, and beta-phellandrene at 8.06% to 8.10% by weight, wherein the controlled concentrations reduce natural batch-to-batch variation while maintaining 100% balsam fir oil content.

2. The composition of claim 1, wherein the controlled concentrations are achieved by adding isolated alpha-pinene, beta-pinene, and beta-phellandrene extracted from balsam fir oil back into a balsam fir oil base.

3. The composition of claim 1, wherein the controlled concentrations provide enhanced rodent repellent efficacy compared to unenhanced balsam fir oil having natural variation in isolate concentrations.

4. The composition of claim 1, wherein the alpha-pinene and beta-pinene concentrations balance the beta-phellandrene concentration to maintain a natural fragrance profile of balsam fir.

5. The composition of claim 1, wherein the alpha-pinene, beta-pinene, and beta-phellandrene trigger flight responses in rodents.

6. The composition of claim 1, wherein the controlled concentrations eliminate natural variation of terpene compounds and increase efficacy while remaining 100% natural balsam fir oil.

7. A method of producing a standardized balsam fir oil composition, comprising:

analyzing natural batch-to-batch variation of terpene isolates in balsam fir oil;

extracting $\alpha$-pinene, $\beta$-pinene and $\beta$-phellandrene from balsam fir oil;

establishing fixed concentration ranges for each isolate; and adding the extracted isolates into balsam fir oil to achieve controlled concentration.

8. The method of claim 7, wherein the extracting utilizes distillation processes.

9. The method of claim 7, wherein the distillation processes comprise steam distillation at temperatures that preserve terpene compound integrity.

10. The method of claim 7, wherein the establishing comprises identifying isolates that trigger flight responses in rodents.

11. The method of claim 7, wherein the adding maintains 100% balsam fir oil content while reducing batch-to-batch variation.

12. The method of claim 7, further comprising analyzing natural batch-to-batch variation of terpene isolates in balsam fir oil prior to the establishing.

13. The method of claim 12, wherein the exposing comprises deploying the composition in a treatment area for up to 30 days.

14. The method of claim 12, wherein the exposing provides consistent repellent efficacy across multiple production batches.

15. The method of claim 12, wherein the exposing demonstrates stable rodent repellent performance across multiple production batches.

16. The method of claim 12, further comprising incorporating the composition into a breathable pouch that permits evaporation and dispersal of the composition.

17. The method of claim 12, wherein the exposing utilizes beta-pinene concentration to provide a peppery-minty scent profile component.

18. The method of claim 12, wherein the exposing further comprises monitoring rodent behavior to confirm flight response effectiveness.

19. The method of claim 7, wherein the extracting comprises using the same distillation processes used to extract the balsam fir oil.

20. A method of repelling rodents, comprising: exposing rodents to a balsam fir oil composition having controlled concentrations of alpha-pinene at 14.51% to 14.55% by weight, beta-pinene at 27.12% to 27.52% by weight, and beta-phellandrene at 8.06% to 8.10% by weight in an amount effective to trigger a flight response in the rodents.

\*   \*   \*   \*   \*